(12) United States Patent
Kim et al.

(10) Patent No.: US 12,189,874 B2
(45) Date of Patent: Jan. 7, 2025

(54) DISPLAY APPARATUS HAVING A PLURALITY OF OPENINGS AND METHOD OF MANUFACTURING THE SAME

(71) Applicant: SAMSUNG DISPLAY CO., LTD., Yongin-si (KR)

(72) Inventors: Sunghoon Kim, Yongin-si (KR); Taehyeog Jung, Yongin-si (KR); Byunghoon Kang, Yongin-si (KR); Sanghoon Kim, Yongin-si (KR); Jingyu Sim, Yongin-si (KR); Hyunji Lee, Yongin-si (KR); Minhoon Choi, Yongin-si (KR); Seongjin Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/202,532

(22) Filed: May 26, 2023

(65) Prior Publication Data

US 2024/0134469 A1 Apr. 25, 2024
US 2024/0231516 A9 Jul. 11, 2024

(30) Foreign Application Priority Data

Oct. 24, 2022 (KR) .................. 10-2022-0137661

(51) Int. Cl.
*G06F 3/041* (2006.01)
*G09G 3/3233* (2016.01)

(52) U.S. Cl.
CPC .... *G06F 3/041* (2013.01); *G06F 2203/04103* (2013.01); *G09G 3/3233* (2013.01); *G09G 2300/0842* (2013.01)

(58) Field of Classification Search
CPC ....................................................... G06F 3/041
See application file for complete search history.

(56) References Cited

U.S. PATENT DOCUMENTS

| 9,354,476 | B2 | 5/2016 | Han et al. | |
|---|---|---|---|---|
| 10,020,462 | B1 | 7/2018 | Ai et al. | |
| 2020/0401275 | A1* | 12/2020 | Shin | G06F 3/0445 |
| 2021/0118337 | A1* | 4/2021 | Park | G09F 9/301 |
| 2021/0192989 | A1 | 6/2021 | Ahn et al. | |
| 2021/0202592 | A1* | 7/2021 | Kim | H10K 71/00 |
| 2022/0006038 | A1 | 1/2022 | Park et al. | |
| 2022/0190264 | A1 | 6/2022 | Yun et al. | |
| 2022/0209165 | A1* | 6/2022 | Hyun | H10K 50/841 |
| 2022/0376192 | A1 | 11/2022 | Kim et al. | |

FOREIGN PATENT DOCUMENTS

| KR | 1020180079093 A | 7/2018 |
|---|---|---|
| KR | 1020210081485 A | 7/2021 |
| KR | 1020220003892 A | 1/2022 |
| KR | 1020220082964 A | 6/2022 |

* cited by examiner

*Primary Examiner* — Chun-Nan Lin
(74) *Attorney, Agent, or Firm* — CANTOR COLBURN LLP

(57) ABSTRACT

A display apparatus includes: digitizer; an adhesive layer disposed on the digitizer to contact the digitizer; and a substrate disposed on the adhesive layer to contact the adhesive layer. The substrate includes a first substrate in which a plurality of first structures, each including an opening or groove, are defined such that the first substrate is folded about a folding axis extending in a first direction, and the first substrate includes a glass material.

20 Claims, 14 Drawing Sheets

DISPLAY APPARATUS HAVING A PLURALITY OF OPENINGS AND METHOD OF MANUFACTURING THE SAME

This application claims priority to Korean Patent Application No. 10-2022-0137661, filed on Oct. 24, 2022, and all the benefits accruing therefrom under 35 U.S.C. § 119, the content of which in its entirety is herein incorporated by reference.

BACKGROUND

1. Field

One or more embodiments relate to apparatuses and methods, and more particularly, to a display apparatus and a method of manufacturing the same.

2. Description of the Related Art

An electronic device based on mobility has come into widespread use. Tablet personal computers ("PCs"), in addition to small-sized electronic devices such as mobile phones, have been widely used as the mobile electronic devices.

In order to support various functions, the mobile electronic devices include a display for providing a user with visual information such as images or videos. As components for driving such displays have become miniaturized, occupancy of the displays in electronic devices has gradually been increasing. Moreover, a structure that may be curved to have a predetermined angle from a flat state has been developed.

SUMMARY

One or more embodiments include a display apparatus having no special plates and no special protective films.

However, the one or more embodiments are only examples, and the scope of the disclosure is not limited thereto.

Additional aspects will be set forth in part in the description which follows and, in part, will be apparent from the description, or may be learned by practice of the presented embodiments of the disclosure.

According to one or more embodiments, a display apparatus includes: digitizer, an adhesive layer disposed on the digitizer to contact the digitizer; and a substrate disposed on the adhesive layer to contact the adhesive layer. The substrate includes a first substrate in which a plurality of first structures, each including an opening or groove, are defined such that the first substrate is folded about a folding axis extending in a first direction, and the first substrate includes a glass material.

The substrate may further include a second substrate disposed on the first substrate and having flexibility.

The second substrate may include a first substrate layer, and a second substrate layer disposed on the first substrate layer.

The substrate may further include a stopper layer disposed on the first substrate.

A length of each of the plurality of first structures in the first direction may be greater than a width of each of the plurality of first structures in a second direction intersecting the first direction.

At least two of the plurality of first structures may have different shapes.

The plurality of first structures may be arranged apart from one another in a second direction intersecting the first direction.

The length of each of the plurality of first structures in the first direction may be equal to a length of the first substrate in the first direction.

The plurality of first structures may include a plurality of $1\text{-}1^{st}$ structures arranged apart from one another in a first column, and a plurality of $1\text{-}2^{nd}$ structures arranged apart from one another in a second column different from the first column, where the first column and the second column may each extend parallel to the folding axis.

A center of each of the plurality of $1\text{-}1^{st}$ structures may be disposed between two adjacent $1\text{-}2^{nd}$ structures of the plurality of $1\text{-}2^{nd}$ structures in a view from a second direction intersecting with the first direction.

The plurality of $1\text{-}1^{st}$ structures and the plurality of $1\text{-}2^{nd}$ structures may be arranged on the same row.

According to one or more embodiments, a method of manufacturing a display apparatus includes: defining a plurality of first structures, each including an opening or groove, in a first substrate including a glass material such that the first substrate is folded about a folding axis extending in a first direction; disposing an adhesive layer on a digitizer to contact the digitizer; and disposing the first substrate on the adhesive layer to contact the adhesive layer.

The defining of the plurality of first structures may include radiating a laser onto the first substrate.

The defining of the plurality of first structures may further include spraying an etchant onto the first substrate.

The method may further include disposing a stopper layer on the first substrate.

The method may further include disposing a second substrate having flexibility on the first substrate.

A length of each of the plurality of first structures in the first direction may be greater than a width of each of the plurality of first structures in a second direction intersecting the first direction.

At least two of the plurality of first structures may have different shapes.

The plurality of first structures may be arranged apart from one another in a second direction intersecting the first direction.

The plurality of first structures may include a plurality of $1\text{-}1^{st}$ structures arranged apart from one another in a first column, and a plurality of $1\text{-}2^{nd}$ structures arranged apart from one another in a second column different from the first column, where the first column and the second column may each extend parallel to the folding axis.

These and/or other aspects will become apparent and more readily appreciated from the following description of the embodiments, taken in conjunction with the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
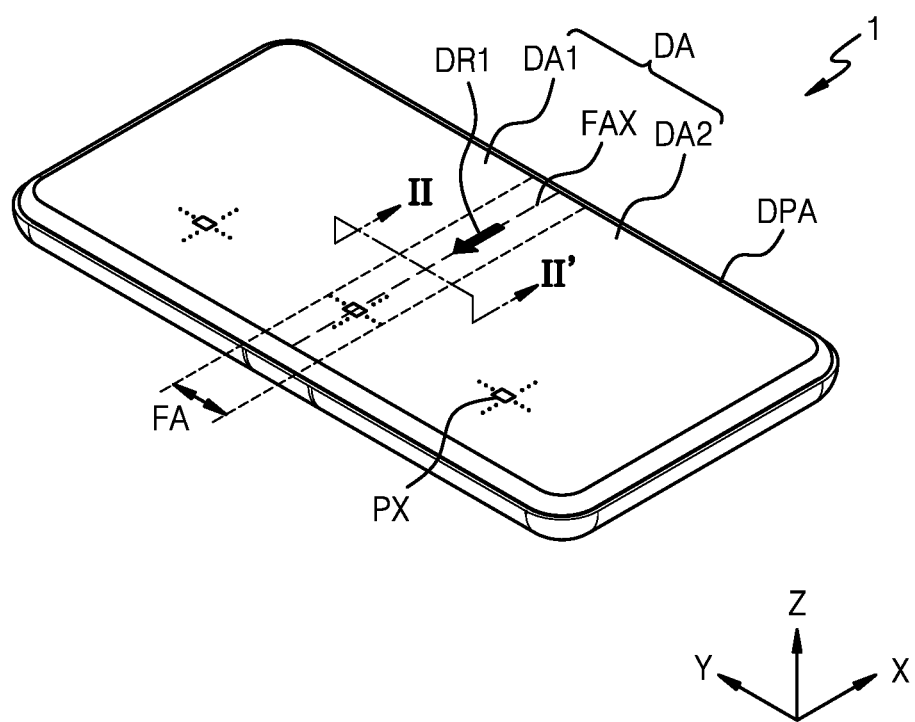
FIG. 1 is a schematic perspective view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Hereinafter, effects and features of the disclosure and a method for accomplishing them will be described more fully with reference to the accompanying drawings, in which embodiments of the present disclosure are shown. The disclosure may, however, be embodied in many different forms and should not be construed as limited to the embodiments set forth herein.

One or more embodiments of the disclosure will be described below in more detail with reference to the accompanying drawings. Those components that are the same as or are in correspondence with each other are rendered the same reference numeral regardless of the figure number, and redundant explanations are omitted.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. For example, since sizes and thicknesses of components in the drawings are arbitrarily illustrated for convenience of explanation, embodiments of the disclosure are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

FIG. 1 is a schematic perspective view of a display apparatus according to an embodiment.

Referring to FIG. 1, a display apparatus 1 displays a moving picture or a still image and may thus be used as the display screens of various products such as not only portable electronic apparatuses, such as mobile phones, smartphones, tablet personal computers (PCs), mobile communication terminals, electronic notebooks, electronic books, portable multimedia players ("PMPs"), navigation devices, and ultra-mobile PCs ("UMPCs") but also televisions, notebooks, monitors, advertisement panels, and Internet of things ("IoT") devices.

The display apparatus 1 may also be used in wearable devices such as smart watches, watch phones, glasses-type displays, and head mounted displays ("HMDs"). The display apparatus 1 may also be used as dashboards of automobiles, center information displays ("CIDs") of the center fasciae or dashboards of automobiles, room mirror displays that replace the side mirrors of automobiles, and displays arranged on the rear sides of front seats to serve as entertainment devices for back seat passengers of automobiles. For convenience of explanation, FIG. 1 illustrates use of a smartphone as the display apparatus 1.

The display apparatus 1 may include a display area DA and a peripheral area DPA surrounding the display area DA. The display apparatus 1 may also include a folding area FA, and the display area DA may include a first display area DA1 and a second display area DA2 spaced apart from each other with the folding area FA therebetween. The peripheral area DPA is a non-display area in which no display elements are arranged.

According to an embodiment, the display area DA and the folding area FA may display an image individually or cooperatively. In detail, pixels PX may be arranged in the display area DA and the folding area FA. Accordingly, the display apparatus 1 may provide an image by using the pixels PX arranged in the display area DA and the folding area FA.

The terms "above" and "on" used herein indicates a +Z direction in relation to the display apparatus 1, and the term "below" used herein indicates a −Z direction in relation to the display apparatus 1.

The terms "left", "right", "upper", and "lower" used herein indicate directions when the display apparatus 1 is viewed from the top. For example, "left" indicates a −X direction, "right" indicates a +X direction, "upper" indicates a +Y direction, and "lower" indicates a −Y direction.

The display apparatus 1 may have a rectangular shape in a plan view. Here, the "plan view" is a view in the Z-axis direction. For example, the display apparatus 1 may have a rectangular planar shape having short sides in an X-axis direction and long sides in a Y-axis direction, as shown in FIG. 1. Corners between the short sides in the X-axis direction and the long sides in the Y-axis direction may be rounded to have a certain curvature, or may have right angles. The planar shape of the display apparatus 1 is not limited to a rectangle, and may be any other polygon, an oval, or an irregular shape.

The display apparatus 1 may have any of various shapes. According to an embodiment, the display apparatus 1 may be provided in a shape that does not change. According to an embodiment, the display apparatus 1 may be provided in a shape of which at least a portion is folded. In this case, the display apparatus 1 may have an in-folding shape or an out-folding shape. For convenience of description, a case where the display apparatus 1 has an in-folding shape will now be focused on and described in detail.

In this case, the display apparatus 1 may be folded about a folding axis FAX extending in a first direction DR1 in the folding area FA. In this embodiment, the first direction DR1 is parallel to the X-axis direction. In this case, when the display apparatus 1 is folded about the folding axis FAX, a size of the display area DA may be reduced, and, when the display apparatus 1 is fully unfolded, the display area DA may display an image while forming a flat surface, thereby forming a large screen image.

Figure 2:
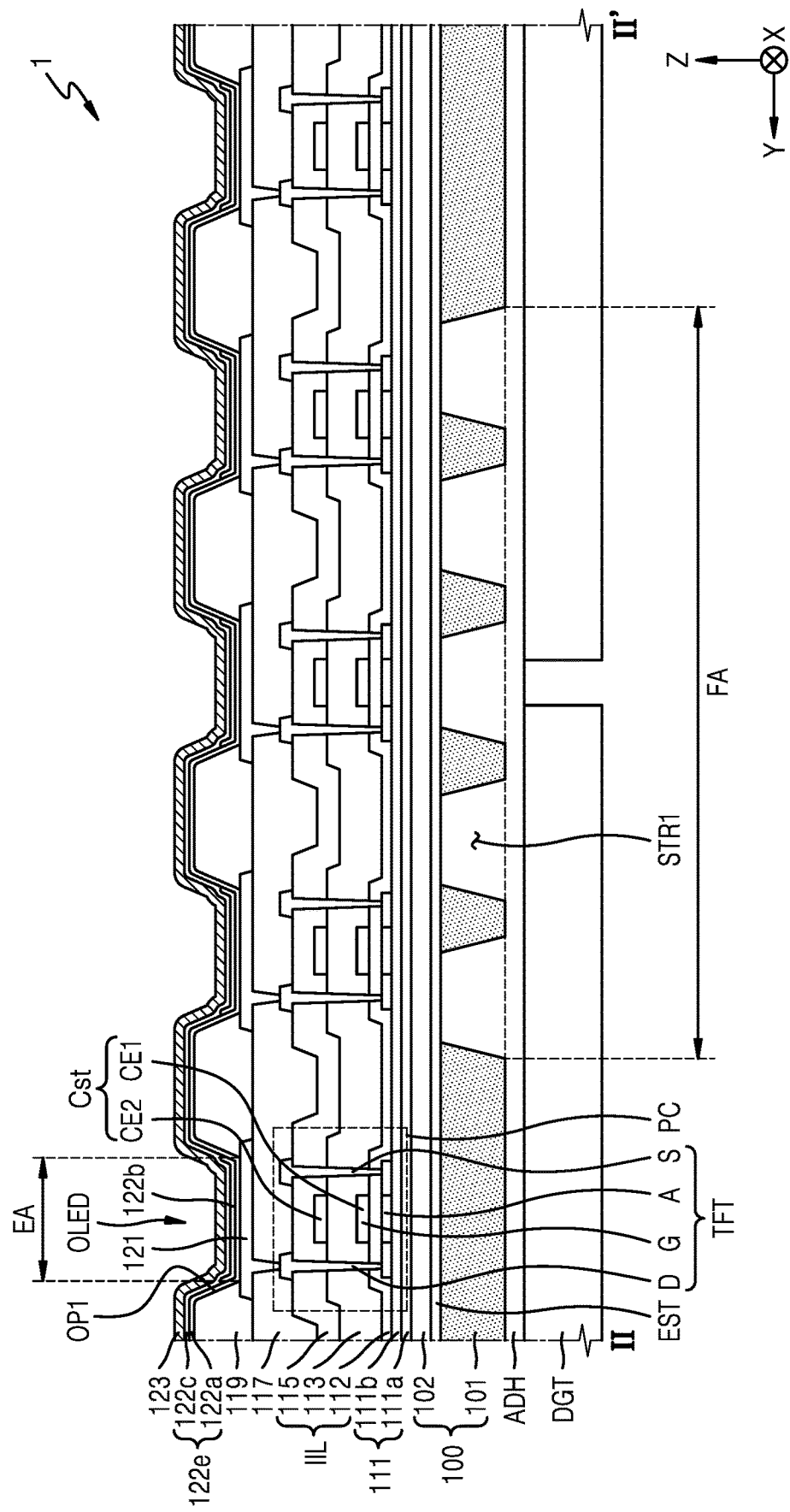
FIG. 2 is a cross-sectional view of a portion of a display apparatus according to an embodiment.

FIG. 2 is a cross-sectional view of a portion of a display apparatus according to an embodiment. FIG. 2 may correspond to a portion taken along line II-II' of FIG. 1.

Referring to FIG. 2, the display apparatus 1 may include a substrate 100, a stopper layer EST, a buffer layer 111, an inorganic insulating layer IIL, a planarization layer 117, a pixel defining layer 119, an emission layer 122b, an organic functional layer 122e, an opposite electrode 123, a digitizer DGT, and an adhesive layer ADH.

The substrate 100 may include a first substrate 101 and a second substrate 102.

The first substrate 101 may include a transparent glass material containing $SiO_2$ as a main component. The first substrate 101 may be a support substrate having a high rigidity.

The second substrate 102 may be disposed on the first substrate 101 and may be flexible. The second substrate 102 may include an insulating material, such as polymer resin. For example, the second substrate 102 may include polymer resin such as polyethersulphone, polyacrylate, polyetherimide, polyethylene naphthalate, polyethylene terephthalate, polyphenylene sulfide, polyarylate, polyimide, polycarbonate, or cellulose acetate propionate.

The stopper layer EST may be disposed on the first substrate 101. In other words, the stopper layer EST may be between the first substrate 101 and the second substrate 102. The stopper layer EST may be an etch stopper. In other words, the stopper layer EST may not be etched by an etchant described later.

For example, the stopper layer EST may be an inorganic layer including at least one of SiOx, SiNx, SiOCx, and SiONx, or an organic layer including an organic material or a polymeric organic material. However, embodiments are not limited thereto.

The buffer layer 111 may be positioned on the substrate 100 and may reduce or prevent infiltration of a foreign material, moisture, or ambient air from below the substrate 100 and may provide a flat surface to the substrate 100. The buffer layer 111 may include an inorganic material (such as oxide or nitride), an organic material, or an organic and inorganic compound, and may be a single layer or multiple layers of an inorganic material and an organic material. A barrier layer (not shown) may be between the substrate 100 and the buffer layer 111 in order to prevent infiltration of ambient air. According to an embodiment, the buffer layer 111 may include silicon oxide ($SiO_x$) or silicon nitride (SiNx). The buffer layer 111 may include a first buffer layer 111a and a second buffer layer 111b, one of which is stacked on the other. In this case, the first buffer layer 111a may include be silicon oxide ($SiO_2$), and the second buffer layer 111b may include silicon nitride ($SiN_x$). Alternatively, the first buffer layer 111a may include silicon nitride ($SiN_x$), and the second buffer layer 111b may include silicon oxide ($SiO_2$). Alternatively, the first buffer layer 111a and the second buffer layer 111b may include the same materials.

A pixel circuit PC (see FIG. 3) may be disposed on the buffer layer 111. The pixel circuit PC may include a thin-film transistor TFT and a storage capacitor Cst. The thin-film transistor TFT may be disposed on the buffer layer 111. The thin-film transistor TFT may include a semiconductor layer A, a gate electrode G, a source electrode S, and a drain electrode D. The thin-film transistor TFT may be connected to an organic light-emitting diode OLED and may drive the organic light-emitting diode OLED.

The semiconductor layer A may be disposed on the buffer layer 111 and may include polysilicon. According to an embodiment, the semiconductor layer A may include amorphous silicon. According to an embodiment, the semiconductor layer A may include oxide of at least one material selected from the group consisting of indium (In), gallium (Ga), tin (Sn), zirconium (Zr), vanadium (V), hafnium (Hf), cadmium (Cd), germanium (Ge), chromium (Cr), titanium (Ti), and zinc (Zn). The semiconductor layer A may include a channel region, and a source region and a drain region both doped with impurities.

A first insulating layer 112 may be included to cover the semiconductor layer A. The first insulating layer 112 may include an inorganic insulating material, such as silicon oxide ($SiO_x$), silicon nitride ($SiN_x$), silicon oxynitride ($Si_xO_yN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). The first insulating layer 112 may be a single layer or a multi-layer including the aforementioned inorganic insulating materials.

The gate electrode G may be disposed on the first insulating layer 112 and overlap the semiconductor layer A in a plan view. The gate electrode G may include molybdenum (Mo), aluminum (Al), copper (Cu), or titanium (Ti), and may include a single layer or multiple layers. According to an embodiment, the gate electrode G may be a single Mo layer.

The second insulating layer 113 may be included to cover the gate electrode G. The second insulating layer 113 may include an inorganic insulating material, such as silicon oxide ($SiO_x$), silicon nitride ($SiN_x$), silicon oxynitride ($Si_xO_yN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). The second insulating layer 113 may be a single layer or a multi-layer including the aforementioned inorganic insulating materials.

An upper electrode CE2 of the storage capacitor Cst may be disposed on the second insulating layer 113. The upper electrode CE2 disposed on the second insulating layer 113 may overlap the gate electrode G disposed below the second insulating layer 113 in a plan view. The gate electrode GE and the upper electrode CE2 overlapping each other with the second insulating layer 113 therebetween may constitute the storage capacitor Cst. According to an embodiment, the gate electrode G may be a lower electrode CE1 of the storage capacitor Cst. According to an embodiment, the lower electrode CE1 of the storage capacitor Cst may be included as a separate independent component. In this case, the lower electrode CE1 and the gate electrode G may be disposed apart from each other by a predetermined distance.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may be a single layer or a multi-layer including the aforementioned materials.

A third insulating layer 115 may be formed to cover the upper electrode CE2. The third insulating layer 115 may include an inorganic insulating material, such as silicon oxide ($SiO_x$), silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). The third insulating layer 115 may be a single layer or a multi-layer including the aforementioned inorganic insulating materials.

The source electrode S and the drain electrode D may be disposed on the third insulating layer 115. Each of the source electrode S and the drain electrode D may include a conductive material including, for example, Mo, Al, Cu, and Ti, and may be a multi-layer or a single layer including the aforementioned materials. According to an embodiment, each of the source electrode S and the drain electrode D may have a multi-layer structure of Ti/Al/Ti.

The planarization layer 117 may be disposed on the source electrode S and the drain electrode D. The planarization layer 117 may have a flat upper surface such that a pixel electrode 121 to be disposed above the planarization layer 117 is formed flat.

The planarization layer 117 may include an organic material or an inorganic material and may have a single layer structure or a multi-layer structure. The planarization layer 117 may include a commercial polymer such as benzocyclobutene ("BCB"), polyimide, hexamethyldisiloxane ("HMDSO"), polymethyl methacrylate ("PMMA") or polystyrene ("PS"), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, or the like. The planarization layer 117 may include an inorganic insulating material, such as silicon oxide ($SiO_x$), silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). When the planarization layer 117 is formed, a layer may be formed, and then chemical and mechanical polishing may be performed on the upper surface of the layer to provide a flat upper surface.

The planarization layer 117 may have a via hole through which one of the source electrode S and the drain electrode D of the thin-film-transistor TFT is exposed, and the pixel electrode 121 may contact the source electrode S or the drain electrode D through the via hole and may be electrically connected to the thin-film-transistor TFT.

In FIG. 2, one planarization layer is included. However, according to an embodiment, two planarization layers may be included. The inclusion of two planarization layers may be more favorable for high integration.

The pixel electrode 121 may be disposed on the planarization layer 117. The pixel electrode 121 may include conductive oxide such as indium tin oxide ("ITO"), indium zinc oxide ("IZO"), zinc oxide (ZnO), indium oxide ($In_2O_3$), indium gallium oxide ("IGO"), or aluminum zinc oxide ("AZO"). The pixel electrode 121 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound of these materials. For example, the pixel electrode 121 may have a structure including films including ITO, IZO, ZnO, or $In_2O_3$ above/below the aforementioned reflective layer. In this case, the pixel electrode 121 may have a stack structure of ITO/Ag/ITO.

The pixel defining layer 119 may be disposed on the planarization layer 117. The pixel defining layer 119 may be disposed on the planarization layer 117 and may cover an edge of the pixel electrode 121. A first opening OP1 exposing at least a portion of the pixel electrode 121 may be defined in the pixel defining layer 119. The first opening OP1 may define the size and shape of an emission area EA of the organic light-emitting diode OLED, namely, a pixel P.

The pixel defining layer 119 may prevent an electric arc or the like from occurring on the edge of the pixel electrode 121 by increasing a distance between the edge of the pixel electrode 121 and the opposite electrode 123 over the pixel electrode 121. The pixel defining layer 119 may be formed of an organic insulating material, such as polyimide, polyamide, acryl resin, benzocyclobutene, hexamethyldisiloxane (HMDSO), or phenol resin, via spin coating or the like.

Although not shown in the drawings, a spacer for preventing damage by a mask may be further arranged on the pixel defining layer 119. The spacer may be integrally formed with the pixel defining layer 119. For example, the spacer and the pixel defining layer 119 may be simultaneously formed according to the same process by using a half tone mask process.

An emission layer 122b may be disposed within the first opening OP1 defined in the pixel defining layer 119 to correspond to the pixel electrode 121. The emission layer 122b may include a high molecular weight material or a low molecular weight material and may emit red, green, blue, or white light.

An organic functional layer 122e may be disposed above and/or below the emission layer 122b. According to an embodiment, the organic functional layer 122e may include a first functional layer 122a and/or a second functional layer 122c. According to an embodiment, the first functional layer 122a or the second functional layer 122c may be omitted.

The first functional layer 122a may be disposed below the emission layer 122b. The first functional layer 122a may be a single layer or layers including an organic material. The first functional layer 122a may be a hole transport layer ("HTL") having a single layer structure. Alternatively, the first functional layer 122a may include a hole injection layer ("HIL") and an HTL. The first functional layer 122a may be integrally provided to correspond to organic light-emitting diodes OLED included in the display area DA.

The second functional layer 122c may be disposed above the emission layer 122b. The second functional layer 122c may be a single layer or layers including an organic material. The second functional layer 122c may include an electron transport layer ("ETL") and/or an electron injection layer ("EIL"). The second functional layer 122c may be integrally provided to correspond to the organic light-emitting diodes OLED included in the display area DA.

The opposite electrode 123 may be disposed on the second functional layer 122c. The opposite electrode 123 may include a conductive material having a low work function. For example, the opposite electrode 123 may include a (semi)transparent layer including, for example, silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy of these materials. Alternatively, the opposite electrode 123 may further include a layer, such as ITO, IZO, ZnO, or $In_2O_3$, on the (semi)transparent layer including any of the materials described above. The opposite electrode 123 may be integrally provided to correspond to the organic light-emitting diodes OLED included in the display area DA.

The layers ranging from the pixel electrode 121 to the opposite electrode 123 may constitute an organic light-emitting diode OLED.

The digitizer DGT may be disposed below the substrate 100. An adhesive layer ADH may be disposed on the digitizer DGT to contact the digitizer DGT, and the substrate 100 may be disposed on the adhesive layer ADH to contact the adhesive layer ADH. In other words, the adhesive layer ADH may contact the digitizer DGT and the first substrate 101.

The digitizer DGT may sense a signal that is input from an external electronic pen or the like. For example, the digitizer DGT may sense the intensity, direction, and the like of a signal input by an electronic pen or the like. The digitizer DGT may be electrically connected to a separately-included main circuit board. However, the disclosure is not limited thereto. The digitizer DGT may be split into two digitizers DGT. The two digitizers DGT may be spaced apart from each other in the folding area FA (see FIG. 1). Accordingly, the flexibility of the digitizer DGT may be increased while the display apparatus 1 is being folded.

The digitizer DGT and the substrate 100 may be attached to each other by the adhesive layer ADH. In other words, the adhesive layer ADH may be filled between the digitizer DGT and the substrate 100. For example, the adhesive layer ADH may be a pressure sensitive adhesive ("PSA"). For example, the adhesive layer ADH may include a resin component.

Although not shown in FIG. 2, an input sensing layer may be disposed on the emission layer 122b. The input sensing layer may obtain coordinates information based on an external input, for example, a touch event. The input sensing layer may sense an external input according to, for example, an electrostatic capacitive method. An operation method of the input sensing layer is not particularly limited in the disclosure. An external input may be sensed according to an electromagnetic induction method or a pressure detection method.

A plurality of first structures STR1 including openings or grooves may be defined in the first substrate 101 such that the first substrate 101 is easily folded about the folding axis FAX of FIG. 1 extending in the first direction DR1 of FIG. 1. Here, the first structure STR1 may be an empty space. Because the plurality of first structures STR1 are defined in the folding area FA of the first substrate 101, the flexibility of the first substrate 101 may be increased. For example, as shown in FIG. 2, each of the plurality of first structures STR1 may include an opening. In other words, the first structure STR1 may penetrate the first substrate 101. Therefore, the occurrence of cracks in the first substrate 101 during the folding process may be effectively reduced.

A width of each of the plurality of first structures STR1 measured in the Y-axis direction may gradually decrease in a direction away from the digitizer DGT (e.g., in a +Z-axis direction). A cross-section of each of the plurality of first structures STR1 may have a shape with an inclined lateral surface. Therefore, while the first substrate 101 is being folded, interference between the plurality of first structures STR1 may be prevented.

Although five first structures STR1 are illustrated in FIG. 2, this is only an example. The number of first structures STR1 is not limited thereto.

At least a portion of the adhesive layer ADH may be accommodated in the plurality of first structures STR1. In other words, the adhesive layer ADH may contact the first substrate 101 and the stopper layer EST. Thus, the adhesive layer ADH may improve the durability of the first substrate 101 in the folding area FA.

Due to the first substrate 101 having a high rigidity by including a glass material, a separate plate and a separate protective film disposed between the first substrate 101 and the digitizer DGT may be omitted. Accordingly, the display apparatus 1 may have a reduced thickness. In particular, because a separate plate requiring insulation is omitted, durability and surface quality of the display apparatus 1 may be effectively improved.

Figure 3:
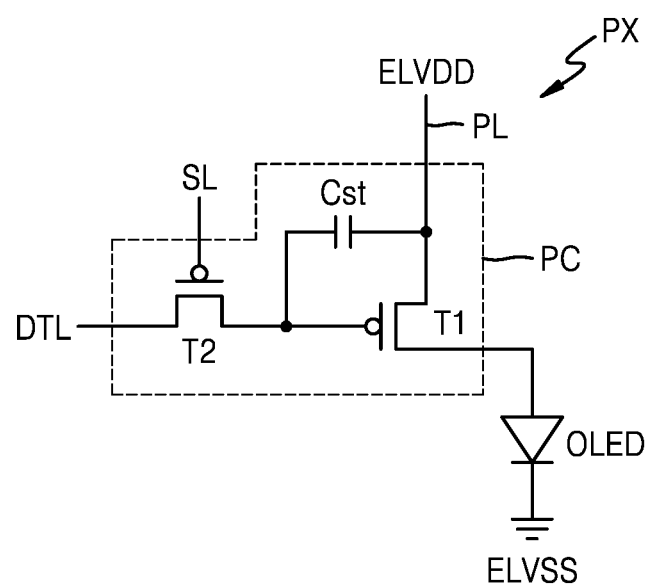
FIG. 3 is an equivalent circuit diagram of one pixel of a display panel according to an embodiment.

FIG. 3 is an equivalent circuit diagram of one pixel of a display panel according to an embodiment.

Each pixel PX may include a pixel circuit PC and a display element, for example, an organic light-emitting diode OLED, connected to the pixel circuit PC. The pixel circuit PC may include a first thin-film transistor T1, a second thin-film transistor T2, and a storage capacitor Cst. Each pixel PX may emit, for example, red light, green light, blue light, or white light via the organic light-emitting diode OLED.

The second thin-film transistor T2, which is a switching thin-film transistor, may be connected to a scan line SL and a data line DTL and may transmit, to the first thin-film transistor T1, a data voltage received via the data line DL, based on a switching voltage received via the scan line SL. The storage capacitor Cst may be connected to the second thin-film transistor T2 and a driving voltage line PL, and may store a voltage corresponding to a difference between a voltage received from the second thin-film transistor T2 and a first power supply voltage ELVDD supplied to the driving voltage line PL.

The first thin-film transistor T1, which is a driving thin-film transistor, may be connected to the driving voltage line PL and the storage capacitor Cst, and may control a driving current flowing from the driving voltage line PL to the organic light-emitting diode OLED, in accordance with a voltage value stored in the storage capacitor Cst. The organic light-emitting diode OLED may emit light having a certain brightness according to the driving current. An opposite electrode (for example, a cathode) of the organic light-emitting diode OLED may receive a second power supply voltage ELVSS.

Although a case where the pixel circuit PC includes two thin-film transistors and one storage capacitor is illustrated in FIG. 3, the disclosure is not limited thereto. The number of thin-film transistors and the number of storage capacitors may vary according to a design of the pixel circuit PC. For example, the pixel circuit PC may further include four or more thin-film transistors in addition to the aforementioned two thin-film transistors.

Figure 4:
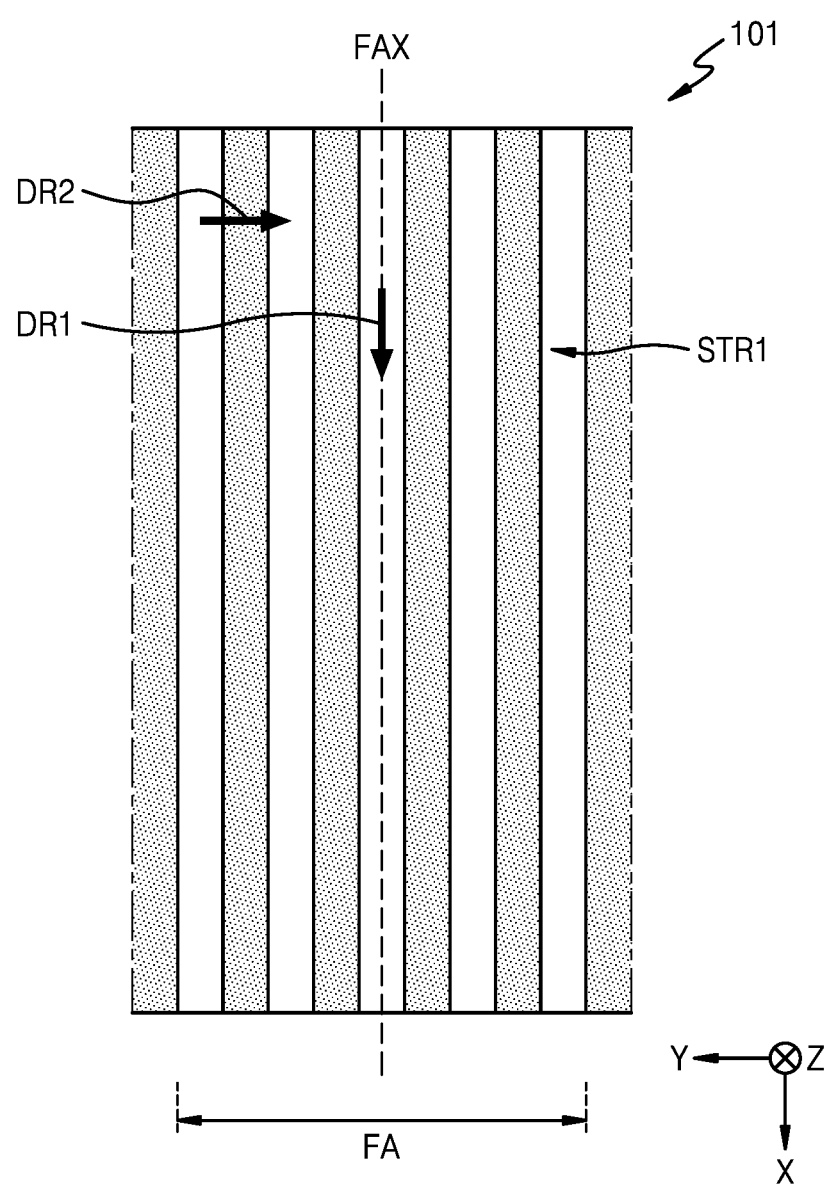
FIG. 4 is a schematic bottom view of a first substrate according to an embodiment.

FIG. 4 is a schematic bottom view of a first substrate according to an embodiment.

Referring to FIG. 4, a plurality of first structures STR1 may be arranged apart from each other in a second direction DR2 intersecting with the first direction DR1. In this embodiment, the second direction DR2 is parallel to the Y-axis direction. The plurality of first structures STR1 may be arranged as a plurality of columns. Intervals between the plurality of first structures STR1 may all be the same as each other. The plurality of first structures STR1 may be arranged symmetrically with one another about the folding axis FAX.

A length of each of the plurality of first structures STR1 in the first direction DR1 may be greater than a width of each of the plurality of first structures STR1 in the second direction DR2 intersecting with the first direction DR1. Each of the plurality of first structures STR1 may extend in the first direction DR1. In the folding area FA, the length of each of the plurality of first structures STR1 in the first direction DR1 may be equal to the length of the first substrate 101 in the first direction DR1. In other words, a planar shape of the plurality of first structures STR1 may include a stripe pattern. Thus, the flexibility of the first substrate 101 may be improved.

Figure 5:
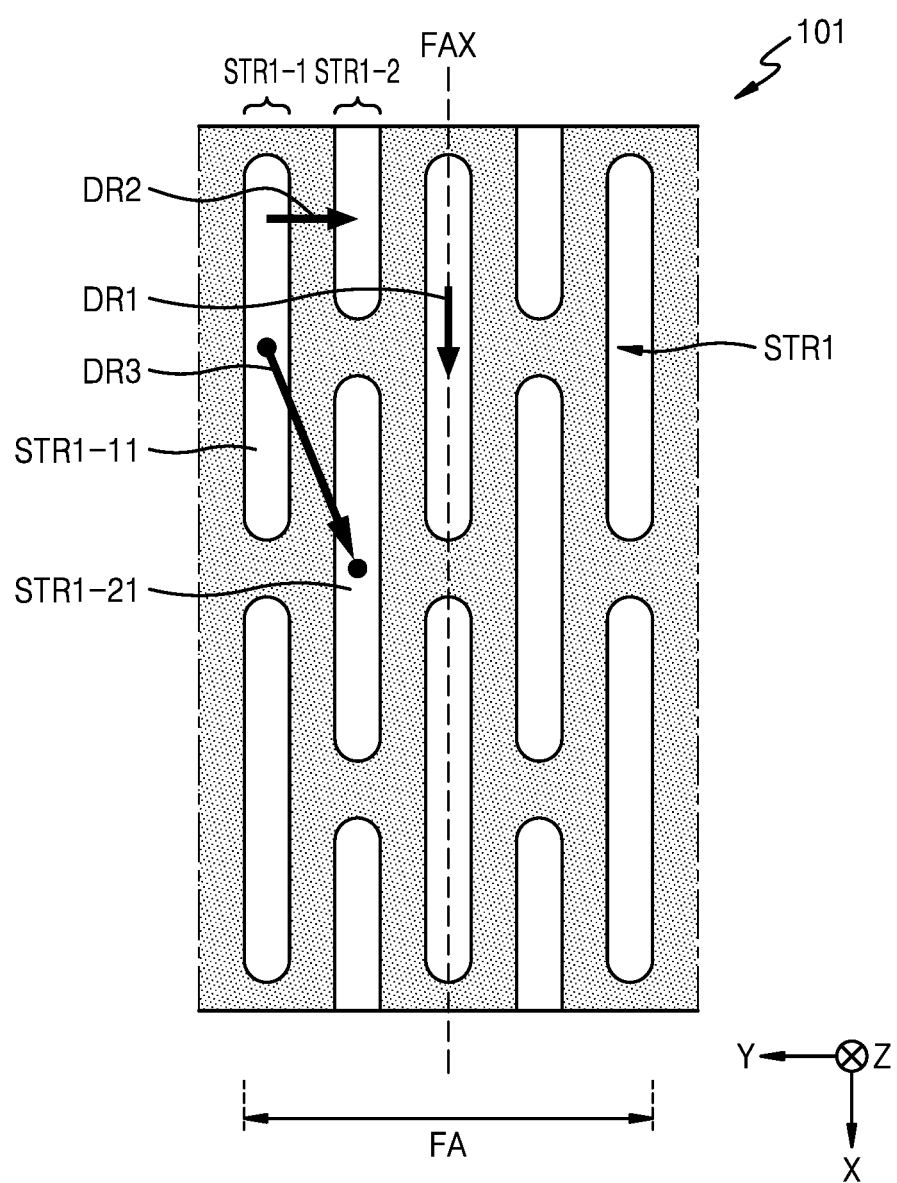
FIG. 5 is a schematic bottom view of a first substrate according to another embodiment.

FIG. 5 is a schematic bottom view of a first substrate according to another embodiment. The same reference numerals in FIGS. 4 and 5 denote the same elements, and thus, repeated descriptions thereof are omitted.

Referring to FIG. 5, the plurality of first structures STR1 may include a plurality of $1\text{-}1^{st}$ structures STR1-1 arranged in a first column and a plurality of $1\text{-}2^{nd}$ structures STR1-2 arranged apart from one another in a second column that is different from the first column. Here, the first column and the second column may each extend parallel to the folding axis FAX.

The plurality of $1\text{-}1^{st}$ structures STR1-1 may be arranged apart from one another in the first direction DR1. The plurality of $1\text{-}2^{nd}$ structures STR1-2 may be arranged apart from one another in the first direction DR1. The plurality of $1\text{-}1^{st}$ structures STR1-1 and the plurality of $1\text{-}2^{nd}$ structures STR1-2 may be arranged apart from one another in the second direction DR2.

A center of each of the plurality of $1\text{-}1^{st}$ structures STR1-1 may be disposed between two adjacent $1\text{-}2^{nd}$ structures STR1-2 in a view from the second direction DR2. The plurality of $1\text{-}1^{st}$ structures STR1-1 may include a $1\text{-}11^{th}$ structure STR1-11, and the plurality of $1\text{-}2^{nd}$ structures STR1-2 may include a $1\text{-}21^{th}$ structure STR1-21 arranged adjacent to the $1\text{-}11^{th}$ structure STR1-11. Here, the $1\text{-}11^{th}$ structure STR1-11 is a particular one of the plurality of $1\text{-}1^{st}$ structures STR1-1, and the $1\text{-}21^{th}$ structure STR1-21 is a particular one of the plurality of $1\text{-}2^{nd}$ structures STR1-2. A third direction DR3 from the center of the $1\text{-}11^{th}$ structure STR1-11 to the center of the $1\text{-}21^{th}$ structure STR1-21 may intersect with the second direction DR2.

Figure 6:
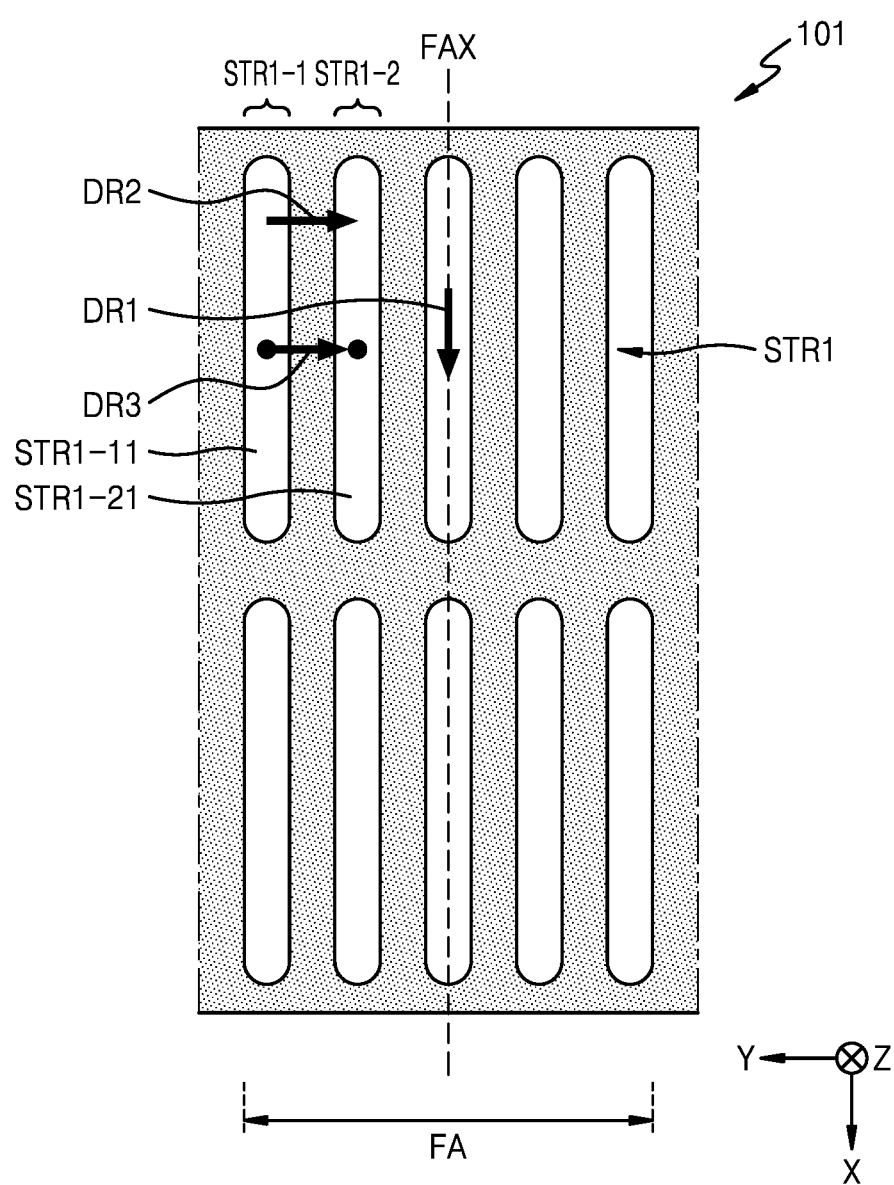
FIG. 6 is a schematic bottom view of a first substrate according to another embodiment.

FIG. 6 is a schematic bottom view of a first substrate according to another embodiment. The same reference numerals in FIGS. 4, 5, and 6 denote the same elements, and thus, repeated descriptions thereof are omitted.

Referring to FIG. 6, the plurality of $1\text{-}1^{st}$ structures STR1-1 and the plurality of $1\text{-}2^{nd}$ structures STR1-2 may be arranged in the same row parallel to the second direction DR2. In this case, the third direction DR3 from the center of the $1\text{-}11^{th}$ structure STR1-11 to the center of the $1\text{-}21^{th}$ structure STR1-21 may be parallel to the second direction DR2. In other words, the $1\text{-}11^{th}$ structure STR1-11 and the $1\text{-}21^{th}$ structure STR1-21 may be arranged on the same row.

FIGS. 7 through 10 are cross-sectional views for explaining a method of manufacturing a display apparatus, according to an embodiment. Reference numerals in FIGS. 7 through 10 that are the same as the reference numerals in FIG. 2 denote the same elements, and thus, repeated descriptions thereof are omitted.

Figure 7:
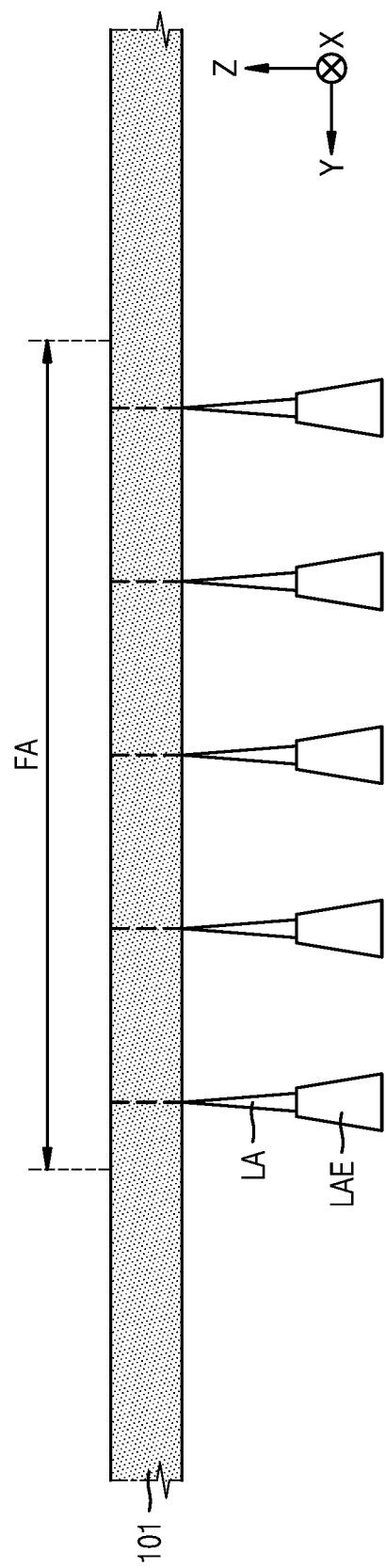
FIGS. 7 through 10 are cross-sectional views for explaining a method of manufacturing a display apparatus, according to an embodiment.

Referring to FIG. 7, a laser LA may be radiated to the folding area FA of the first substrate 101. A laser emitter LAE may emit the laser LA toward the first substrate 101. Although five laser emitters LAE are shown in FIG. 7, this is only an example. One laser emitter LAE may radiate the laser LAE to the first substrate 101 while moving along a designated path.

Figure 8:
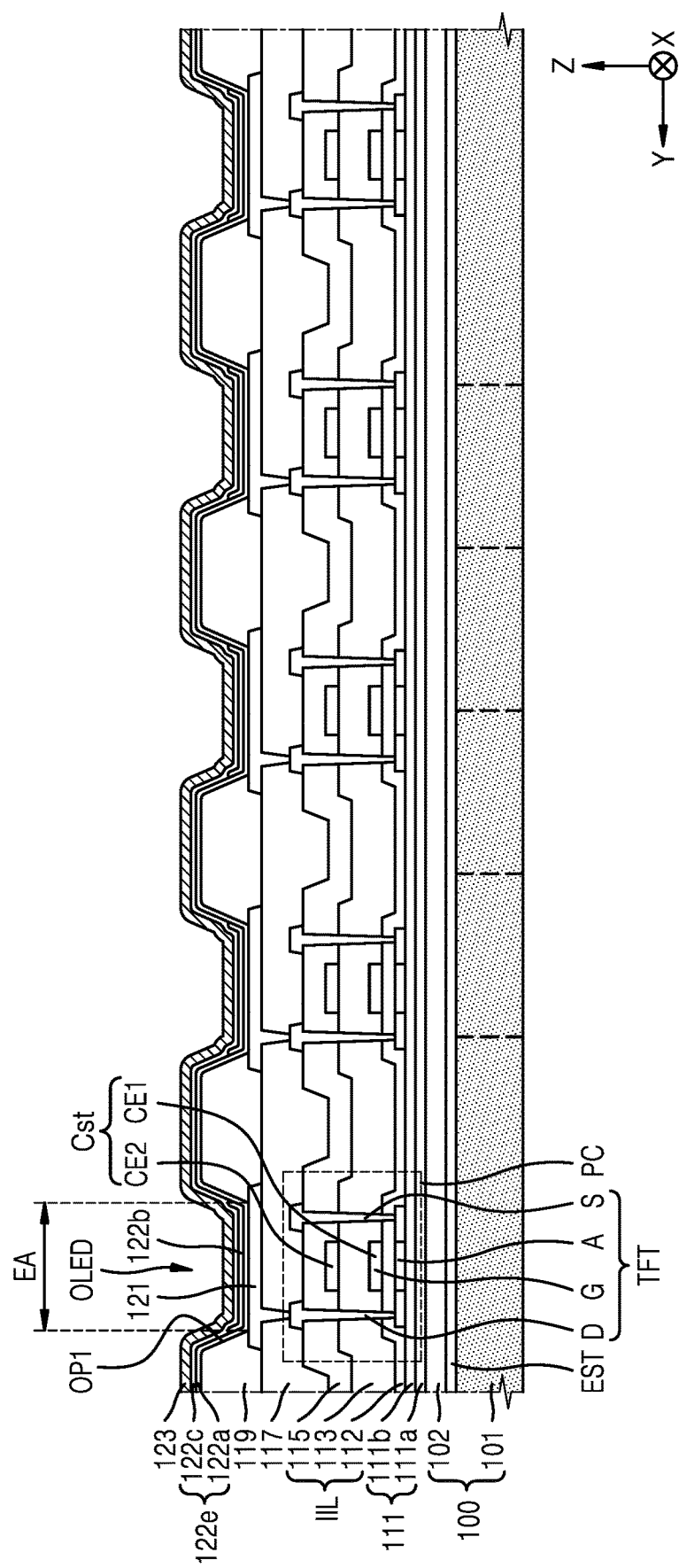

Referring to FIG. 8, a stopper layer EST may be disposed on the first substrate 101 irradiated with the laser LA of FIG. 7. At least one of the second substrate 102, the buffer layer 111, the inorganic insulating layer IIL, the planarization layer 117, the pixel defining layer 119, the emission layer 122b, the organic functional layer 122e, and the opposite electrode 123 may be arranged on the stopper layer EST.

Figure 9:
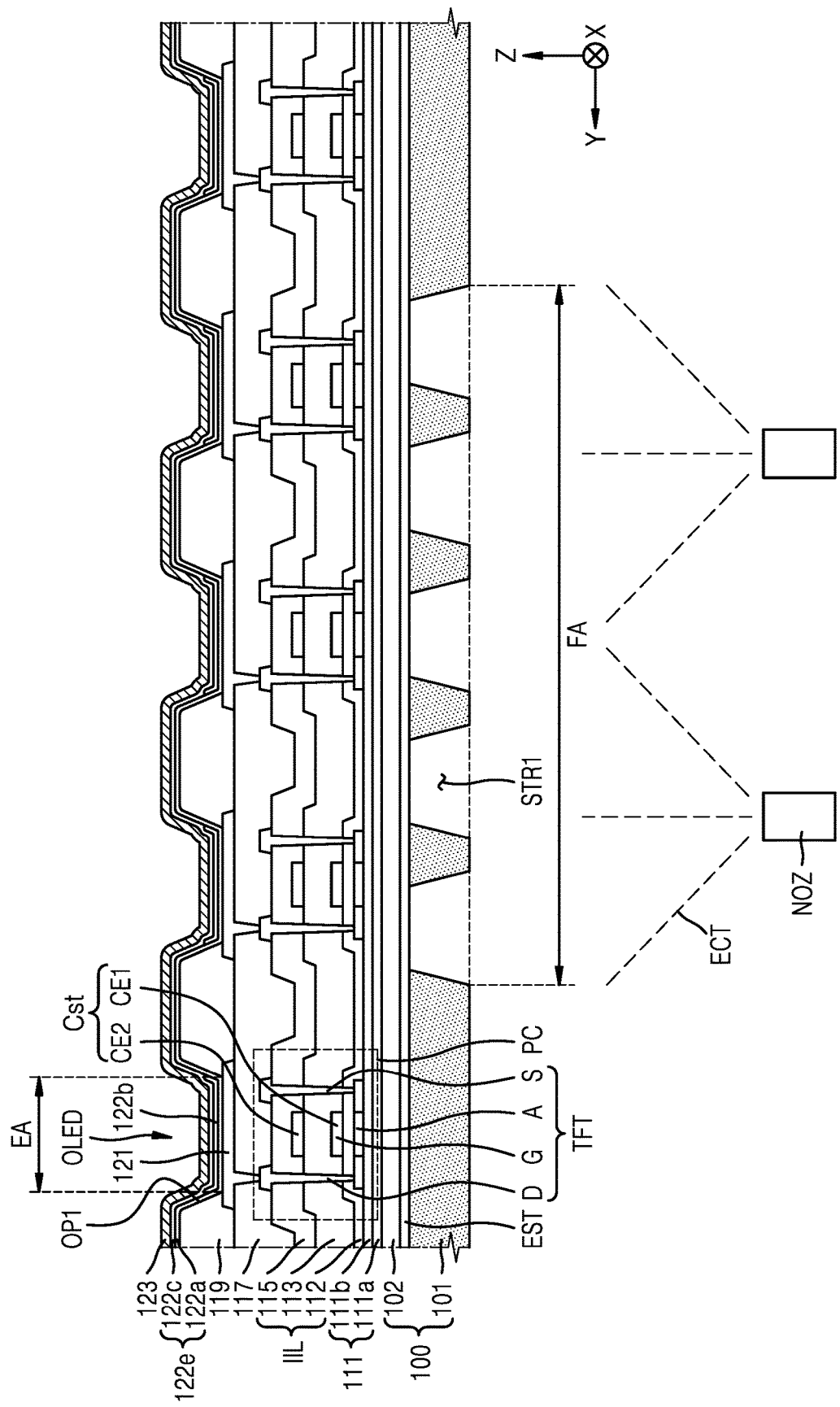

Referring to FIG. 9, an etchant ECT may be sprayed to the folding area FA of the first substrate 101 irradiated with the laser LA of FIG. 7. A nozzle NOZ may spray the etchant ECT toward the first substrate 101. Portions of the first substrate 101 irradiated with the lasers LA may be at least partially removed by the etchant ECT. Accordingly, a plurality of first structures STR1 penetrating the first substrate 101 may be disposed in the first substrate 101. Because the stopper layer EST is not etched by the etchant ECT, the etchant ECT may not pass through the stopper layer EST. Therefore, the stopper layer EST may prevent the etchant ECT from contacting at least one of the second substrate 102, the buffer layer 111, the inorganic insulating layer IIL, the planarization layer 117, the pixel defining layer 119, the emission layer 122b, the organic functional layer 122e, and the opposite electrode 123.

Figure 10:
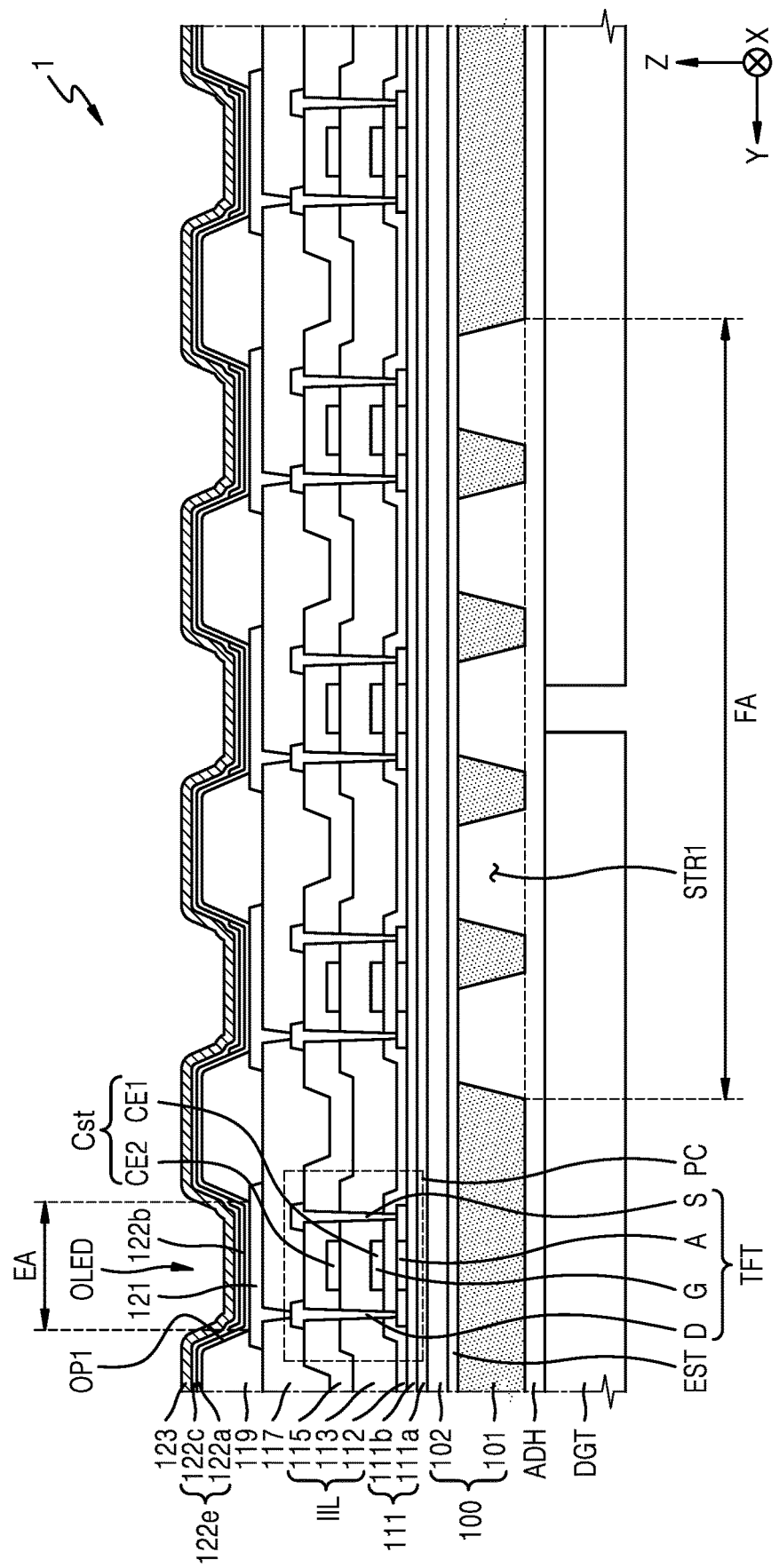

Referring to FIG. 10, when the plurality of first structures STR1 are defined in the first substrate 101, the adhesive layer ADH may be disposed on the digitizer DGT to contact the digitizer DGT, and the first substrate 101 may be disposed on the adhesive layer ADH to contact the adhesive layer ADH.

According to the process described above with reference to FIGS. 7 and 8, after the laser LA is radiated onto the first substrate 101, the stopper layer EST is disposed on the first substrate 101, and at least one of the second substrate 102, the buffer layer 111, the inorganic insulating layer IIL, the planarization layer 117, the pixel defining layer 119, the emission layer 122b, the organic functional layer 122e, and the opposite electrode 123 is disposed on the stopper layer EST. However, the order of the process described above with reference to FIGS. 7 and 8 is not limited thereto.

For example, after the stopper layer EST is disposed on the first substrate 101 and at least one of the second substrate 102, the buffer layer 111, the inorganic insulating layer IIL, the planarization layer 117, the pixel defining layer 119, the emission layer 122b, the organic functional layer 122e, and the opposite electrode 123 is disposed on the stopper layer EST as shown in FIG. 8, the laser LA may be radiated onto the first substrate 101 as shown in FIG. 7.

For example, after the stopper layer EST is disposed on the first substrate 101 and the laser LA is radiated onto the first substrate 101, at least one of the second substrate 102, the buffer layer 111, the inorganic insulating layer IIL, the planarization layer 117, the pixel defining layer 119, the emission layer 122b, the organic functional layer 122e, and the opposite electrode 123 may be arranged on the stopper layer EST.

Figure 11:
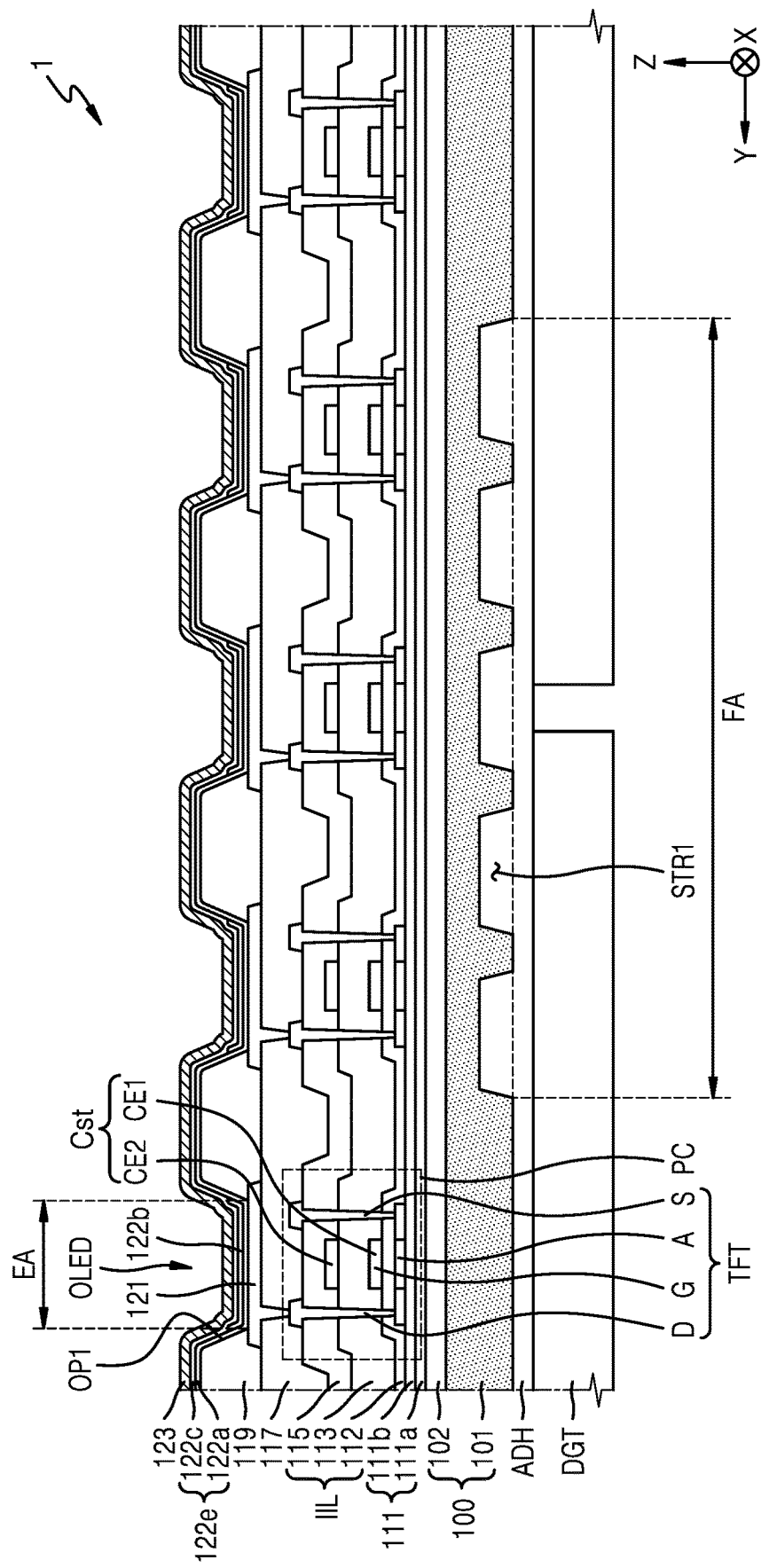
FIG. 11 is a cross-sectional view of a portion of a display apparatus according to another embodiment.

FIG. 11 is a cross-sectional view of a portion of a display apparatus according to another embodiment. FIG. 11 may correspond to a portion taken along line II-II' of FIG. 1.

The same reference numerals in FIGS. 2 and 11 denote the same elements, and thus, repeated descriptions thereof are omitted.

Referring to FIG. 11, each of the plurality of first structures STR1 may include a groove. In this structure, in a process of defining the first structure STR1 on the first substrate 101 by spraying the etchant ECT onto the first substrate 101, the etchant ECT may not pass through the first substrate 101. Thus, the stopper layer EST described with reference to FIG. 2 may be omitted.

In this structure, the adhesive layer ADH may not contact the second substrate 102. In other words, in the folding area FA, a lower surface (for example, a surface directed toward a −Z axis) of the second substrate 102 may contact an upper surface (for example, a surface directed toward a +Z axis) of the first substrate 101. Therefore, due to expansion of the adhesive layer ADH during curing of the adhesive layer ADH or non-recovery of the adhesive layer ADH during repetitive folding processes, the occurrence of unevenness of the second substrate 102 in the folding area FA may be reduced.

Figure 12:
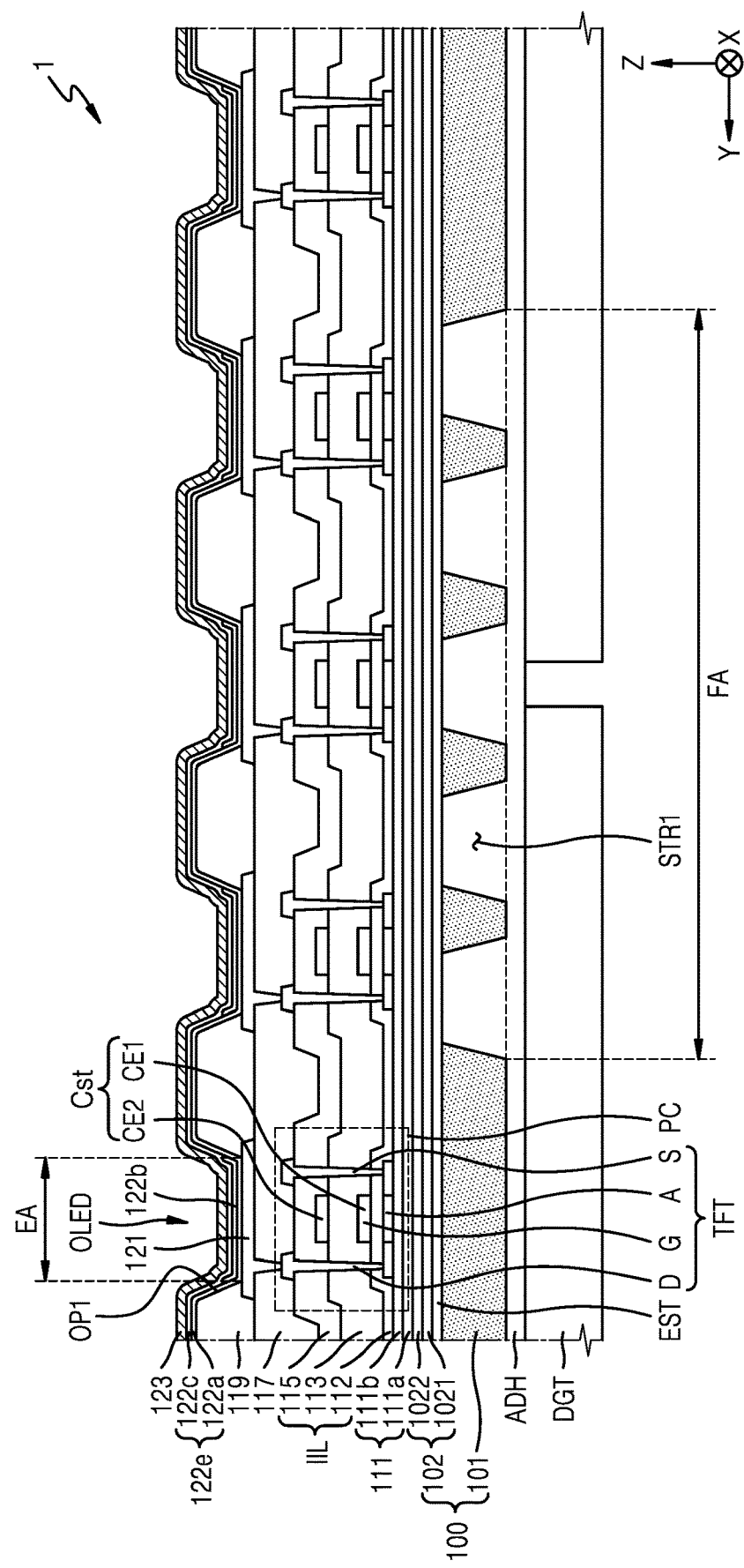
FIG. 12 is a cross-sectional view of a portion of a display apparatus according to another embodiment.

FIG. 12 is a cross-sectional view of a portion of a display apparatus according to another embodiment. FIG. 12 may correspond to a portion taken along line II-II' of FIG. 1.

The same reference numerals in FIGS. 2 and 12 denote the same elements, and thus, repeated descriptions thereof are omitted.

Referring to FIG. 12, the second substrate 102 may include a first substrate layer 1021 and a second substrate layer 1022 disposed on the first substrate layer 1021. The first substrate layer 1021 may be between the first substrate 101 and the second substrate layer 1022. The first substrate layer 1021 may contact the stopper layer EST and the second substrate layer 1022. An adhesive may be disposed between the first substrate layer 1021 and the second substrate layer 1022. The first substrate layer 1021 and the second substrate layer 1022 may reduce introduction of foreign substances such as moisture and oxygen into the display apparatus 1.

Figure 13:
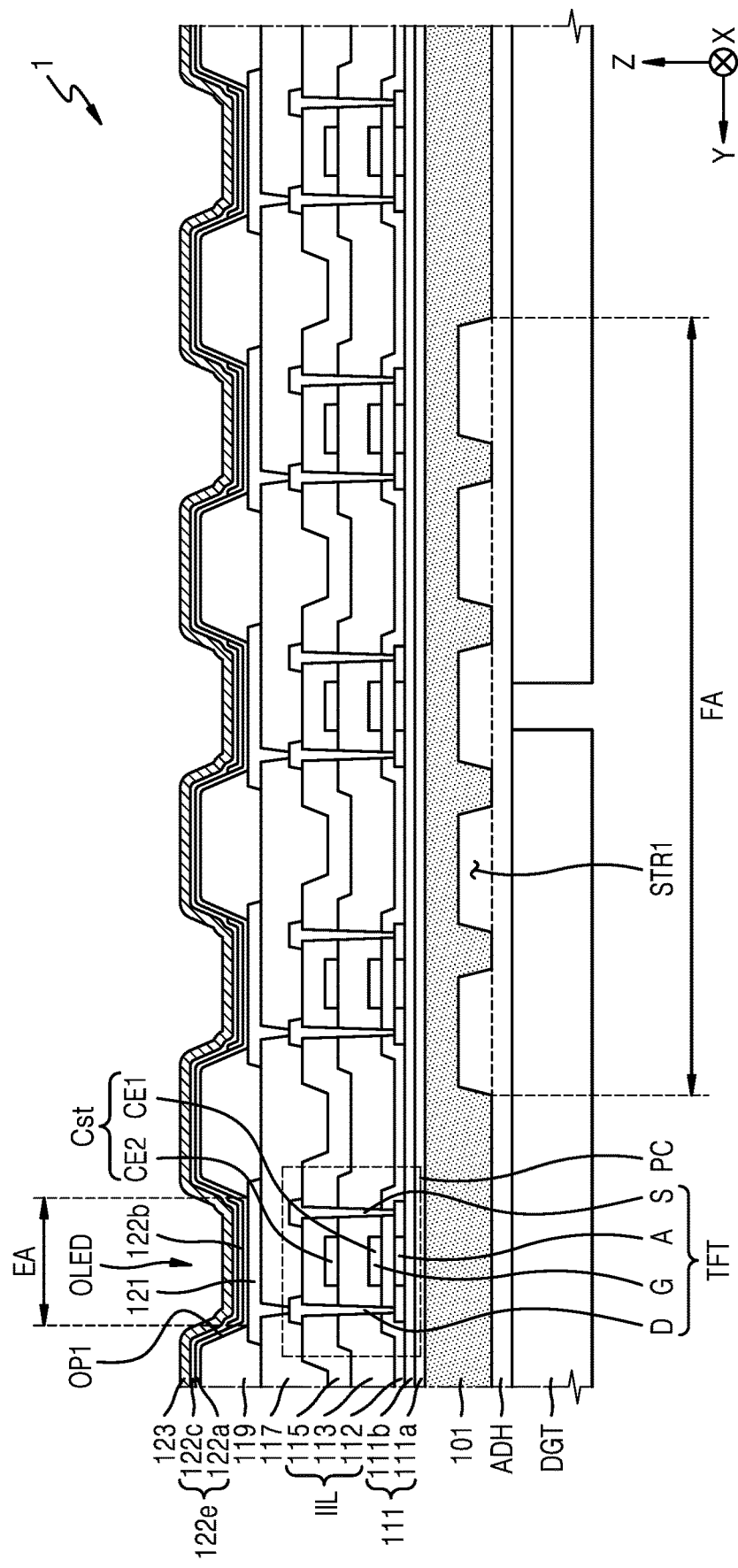
FIG. 13 is a cross-sectional view of a portion of a display apparatus according to another embodiment.

FIG. 13 is a cross-sectional view of a portion of a display apparatus according to another embodiment. FIG. 13 may correspond to a portion taken along line II-II' of FIG. 1.

The same reference numerals in FIGS. 2 and 13 denote the same elements, and thus, repeated descriptions thereof are omitted.

Referring to FIG. 13, each of the plurality of first structures STR1 may include a groove, and the second substrate 102 described above with reference to FIG. 2 may be omitted. In this structure, the first substrate 101 may contact at least one of the buffer layer 111, the inorganic insulating layer IIL, the planarization layer 117, and the pixel defining layer 119. Accordingly, manufacturing costs of the display apparatus 1 may be reduced.

Figure 14:
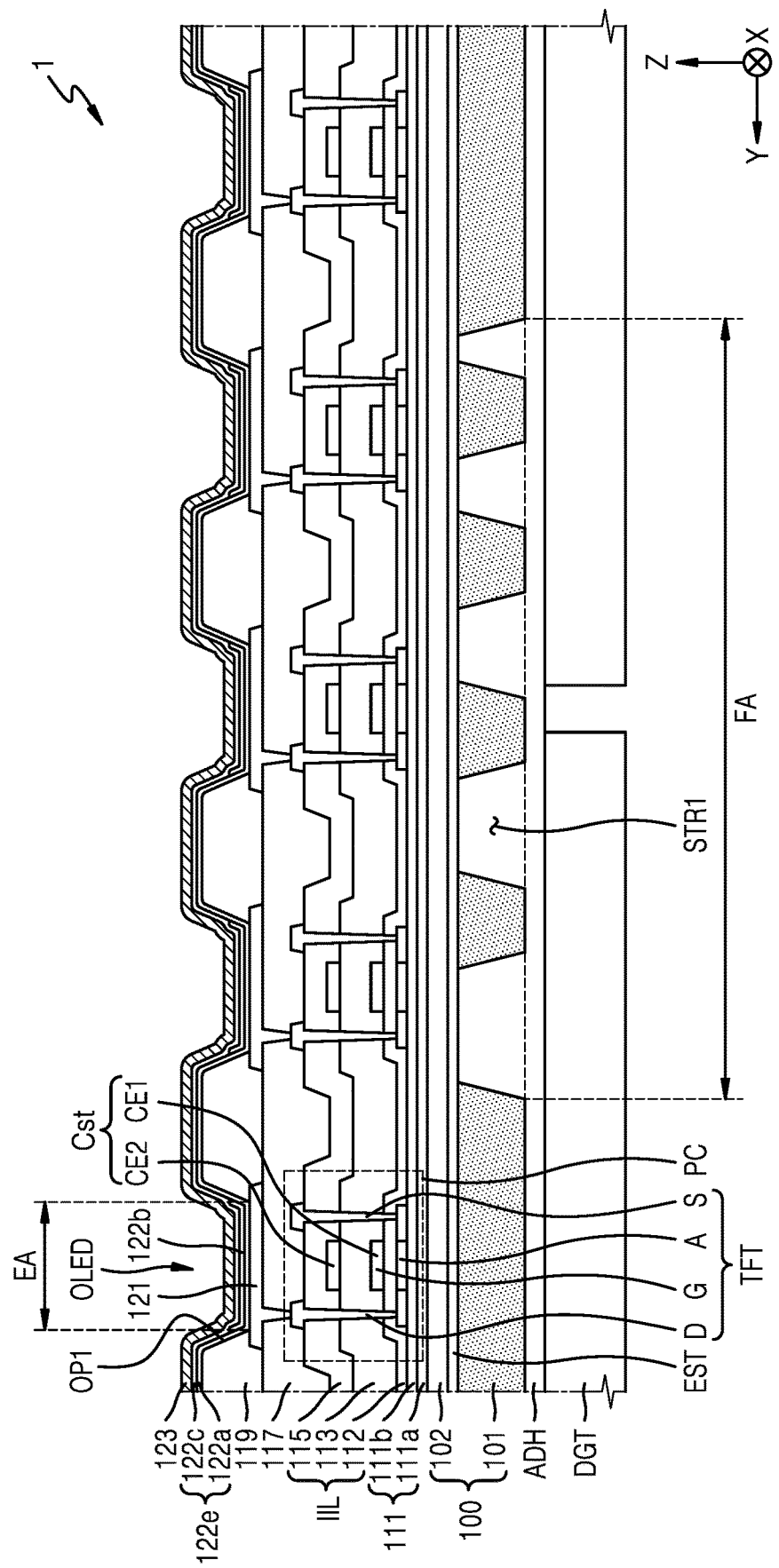
FIG. 14 is a cross-sectional view of a portion of a display apparatus according to another embodiment.

FIG. 14 is a cross-sectional view of a portion of a display apparatus according to another embodiment. FIG. 14 may correspond to a portion taken along line II-II' of FIG. 1.

The same reference numerals in FIGS. 2 and 14 denote the same elements, and thus, repeated descriptions thereof are omitted.

Referring to FIG. 14, at least two of the plurality of first structures STR1 may have different shapes from each other. Respective cross-sectional shapes of the plurality of first structures STR1 may have different sizes from one another. Accordingly, visual recognition of the plurality of first structures STR1 by a user may be reduced due to repetition of the first structure STR1. For example, as shown in FIG. 14, the respective sizes of the respective cross-sectional shapes of the plurality of first structures STR1 may gradually decrease in the −Y-axis direction. However, this is only an example, and the shapes of the plurality of first structures STR1 are not limited thereto.

The display apparatus 1 described above with reference to FIGS. 11 and 14 may be manufactured in the same method as the method of manufacturing the display apparatus 1, described above with reference to FIGS. 7 through 10. In other words, similar to the method of manufacturing the display apparatus 1, described above with reference to FIGS. 7 through 10, the method of manufacturing the display apparatus 1, described above with reference to FIGS. 11 and 14, may include the operation of radiating the laser LA of FIG. 7 to the first substrate 101 and the operation of spraying the etchant ECT of FIG. 9 to the first substrate 101.

According to embodiments, a thickness of a display apparatus may be reduced because a separate plate and a separate protective film are omitted.

According to embodiments, the durability and surface quality of a display apparatus may be effectively improved because a separate insulation plate is omitted.

Effects of the disclosure are not limited to the aforementioned effects, and other effects not mentioned will be clearly understood by those skilled in the art from the description of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a digitizer;
an adhesive layer disposed on the digitizer to contact the digitizer; and
a substrate disposed on the adhesive layer to contact the adhesive layer,
wherein the substrate comprises a first substrate in which a plurality of first structures, each including an opening or groove, are defined such that the first substrate is folded about a folding axis extending in a first direction, and
the first substrate includes a glass material and is a support substrate.

2. The display apparatus of claim 1, wherein the substrate further comprises a second substrate disposed on the first substrate and having flexibility.

3. The display apparatus of claim 2, wherein the second substrate comprises:
a first layer of the second substrate; and
a second layer of the second substrate disposed on the first layer of the second substrate.

4. The display apparatus of claim 1, further comprising a stopper layer disposed on the first substrate.

5. The display apparatus of claim 1, wherein a length of each of the plurality of first structures in the first direction is greater than a width of each of the plurality of first structures in a second direction intersecting with the first direction.

6. The display apparatus of claim 1, wherein respective shapes of at least two of the plurality of first structures are different from each other.

7. The display apparatus of claim 1, wherein the plurality of first structures are arranged apart from one another in a second direction intersecting with the first direction.

8. The display apparatus of claim 7, wherein a length of each of the plurality of first structures in the first direction is equal to a length of the first substrate in the first direction.

9. The display apparatus of claim 1, wherein the plurality of first structures comprise:
   a first set of structures arranged apart from one another in a first column; and
   a second set of structures arranged apart from one another in a second column that is different from the first column,
   wherein the first column and the second column each extend parallel to the folding axis.

10. The display apparatus of claim 9, wherein a center of each of the first set of structures is disposed between two adjacent structures of the second set of in a view from a second direction intersecting with the first direction.

11. The display apparatus of claim 9, wherein the first set of structures and the second set of structures are arranged on a same row.

12. A method of manufacturing a display apparatus, the method comprising:
   defining, in a first substrate, which is a support substrate, a plurality of first structures, each including an opening or groove, such that the first substrate is folded about a folding axis extending in a first direction, wherein the first substrate includes a glass material;
   disposing an adhesive layer on a digitizer to contact the digitizer; and
   disposing the first substrate on the adhesive layer to contact the adhesive layer.

13. The method of claim 12, wherein the defining of the plurality of first structures comprises radiating a laser to the first substrate.

14. The method of claim 13, wherein the defining of the plurality of first structures further comprises spraying an etchant to the first substrate.

15. The method of claim 13, further comprising:
   disposing a stopper layer on the first substrate.

16. The method of claim 12, further comprising:
   disposing a second substrate having flexibility on the first substrate.

17. The method of claim 12, wherein a length of each of the plurality of first structures in the first direction is greater than a width of each of the plurality of first structures in a second direction intersecting with the first direction.

18. The method of claim 12, wherein respective shapes of at least two of the plurality of first structures are different from each other.

19. The method of claim 12, wherein the plurality of first structures are arranged apart from one another in a second direction intersecting with the first direction.

20. The method of claim 12, wherein the plurality of first structures comprise:
   a first set of structures arranged apart from one another in a first column; and
   a second structures arranged apart from one another in a second column that is different from the first column,
   wherein the first column and the second column each extend parallel to the folding axis.

* * * * *